United States Patent
Corvin et al.

(10) Patent No.: US 6,698,848 B1
(45) Date of Patent: Mar. 2, 2004

(54) TIME RESET SAFETY TIMER CIRCUIT

(75) Inventors: John H. Corvin, Greer, SC (US);
Richard J. Mazur, Greer, SC (US);
James A. Wood, Spartanburg, SC (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 10/338,099

(22) Filed: Jan. 7, 2003

(51) Int. Cl.$^7$ ................................................. B60T 8/00
(52) U.S. Cl. ..................... 303/20; 303/122.06; 303/199; 701/70
(58) Field of Search ..................... 303/20, 199, 122.06, 303/128, 3, 122, 15, 174, 7; 701/20, 19, 70, 76, 83, 71, 84, 78; 714/47, 45; 180/197; 246/182 R

(56) References Cited

U.S. PATENT DOCUMENTS 4,999,779 A * 3/1991 Wood et al. ................... 701/83
5,098,169 A * 3/1992 Wood et al. ........... 303/122.02
5,752,212 A * 5/1998 Wood et al. ................... 701/71

* cited by examiner

*Primary Examiner*—Douglas C. Butler
(74) *Attorney, Agent, or Firm*—James Ray & Associates

(57) ABSTRACT

The time reset safety timer circuit eliminates approximately half of the external interfaces of the prior art safety timers. The prior art safety timers depend on vehicle axle speeds, brake indications, and/or trainline signals to initiate a safety timer reset. The time reset safety timer circuit in the present invention uses only internal information to initiate a safety timer reset. This simplifies the circuitry of the time reset safety timer circuit, which improves the reliability.

15 Claims, 4 Drawing Sheets

INVENTION VARIATION

TIME RESET SAFETY TIMER CIRCUIT

FIELD OF INVENTION

The present invention relates, in general, to rather commonly used multi-mode friction type brake systems which are disposed, for example, on each truck portion of a subway type transit vehicle and/or a light rail type transit vehicle. More specifically, this invention relates to wheel slip control safety functions, and safety timers which can interrupt a wheel slip control operation to protect magnet valves from excessive wear.

BACKGROUND OF THE INVENTION

It will be appreciated that, in railway and mass and/or rapid transit operations, it is common practice in a complex logic wheel slip and brake control system f or an operator to manually actuate the wheel slip inhibit and, additionally, to have a safety timer and magnet valve state feedback to establish safeguards and to control the operational event recorder. During a long haul, where the train makes infrequent stops, the prior art may timeout inadvertently and the truck would be without wheel slip correction for a long period, such as, until it makes its next stop.

It will also be appreciated by people skilled in the art that presently used safety timers depend on vehicle axle speeds, brake indications, and/or trainline Signal to initiate a safety timer reset. These all utilize a network to communicate with external interfaces and this communication is performed through the use of software. Using a network and its inherent use of software for a safety circuit is problematic due, for example, to component reliability and electrical transmission problems of the network.

SUMMARY OF THE INVENTION

In one aspect the present invention provides a time reset safety timer circuit for use on a rail vehicle comprising a plurality of trucks. The time reset safety timer circuit includes a truck timeout timer connected to a truck timer circuit for receiving a timed out signal from the truck timer circuit. Upon receiving a start timer signal the truck timer circuit waits a first predetermined time and then sends a timed out signal to the truck timeout timer. The truck timeout timer, upon receipt of the timed out signal from the truck timer circuit, waits a second predetermined time and then resets itself and the truck timer circuit.

The truck timer circuit also connects to a truck power feed interface, and a truck wheel slip detection circuit. The truck timer circuit energizes the truck power feed interface when the truck timer circuit is not in a timed out state. It also de-energizes the truck power feed interface when the truck timer circuit is in a timed out state. That is to say the truck power feed interface can be used for interrupting a power feed from a truck magnet valve driver circuit to a truck wheel slip magnet valve. A truck wheel slip detection circuit can be used for detecting when the truck wheel slip magnet valve has been energized and for sending an energization indication signal to the truck timer circuit. It can also be used for detecting when the truck wheel slip magnet valve has been de-energized, and for sending a de-energization indication signal to the truck timer circuit. The truck wheel slip magnet valve can be used for changing the truck brake cylinder pressure when energized from the truck magnet valve driver circuit.

Another aspect of the present invention provides a safety timer, driver, and magnet valve module for use on a rail vehicle comprising a plurality of trucks. Wherein the safety timer, driver, and magnet valve module includes a truck timeout timer connected to the truck timer circuit for receiving timed out signals from the truck timer circuit. Upon receiving a timed out signal from the truck timer circuit the truck timeout timer waits a predetermined time and then sends a reset signal to itself and the truck timer circuit.

The truck timer circuit also connects to a truck power feed interface, and a truck wheel slip detection circuit. The truck timer circuit energizes a truck power feed interface when the truck timer circuit is not timed out. It also de-energizes the truck power feed interface when the truck timer circuit is in a timed out state. The truck power feed interface can be used for interrupting a power feed from a truck magnet valve driver circuit to a truck wheel slip magnet valve driver. The truck wheel slip detection circuit can be used for detecting that the truck wheel slip magnet valve has been energized and for sending an energization indication signal to the truck timer circuit. It can also be used for detecting that a truck wheel slip magnet valve has been de-energized and for sending a de-energization indication signal to the truck timer circuit.

A further aspect of the present invention is to provide a time reset safety timing circuit comprising a safety timer which interrupts a wheel slip control operation after a first predetermined time after the wheel slip control operation begins, and to provide a timeout timer which resets the safety timer circuit after a second predetermined time after the safety timer interrupts the wheel slip control operation.

Still another aspect of the present invention is to provide a method for interrupting and to stop interrupting a wheel slip control operation. This method includes waiting a first predetermined time period after an onset of the wheel slip control operation, and interrupting the wheel slip control operation after the first predetermined time period if the wheel slip control operation is continuous during the first predetermined time period. Waiting for a second predetermined time period after the wheel slip control operation has been interrupted and removing the interruption of the wheel slip control operation, and, if the wheel slip control operation is running when the interruption has been removed, waiting a first predetermined time period and repeating the interruption of the wheel slip control operation, waiting a second predetermined time, and removing the interruption of the wheel slip control operation.

OBJECTS OF THE INVENTION

It is, therefore, one of the primary objects of the present invention to provide a time Preset safety timer circuit that contains simplified and minimized external interfaces.

It is also an object of the present invention to provide a time reset safety timer circuit that improves reliability through the use of internal information to initiate a safety timer reset.

An additional object of the present invention is to provide a time reset safety timer circuit that allows for easier application of a distributed electronic system.

Another object of the present invention is to provide a time reset safety timer circuit that allows the wheel slip control to be restored without having to stop the train.

Additional objects of the present invention are the benefits for long hauls passenger train services where the trains makes infrequent stops. For this type of service, a prior art safety timer may timeout inadvertently and the truck would be without wheel slip correction for a long time period. Utilizing the present invention, the wheel slip control can be restored without the need to stop the train.

These and various other objects and advantages of this invention will become apparent after a full reading of the following detailed description, particularly, when read in conjunction with the attached drawings as described below and the appended claims.

Figure 1:
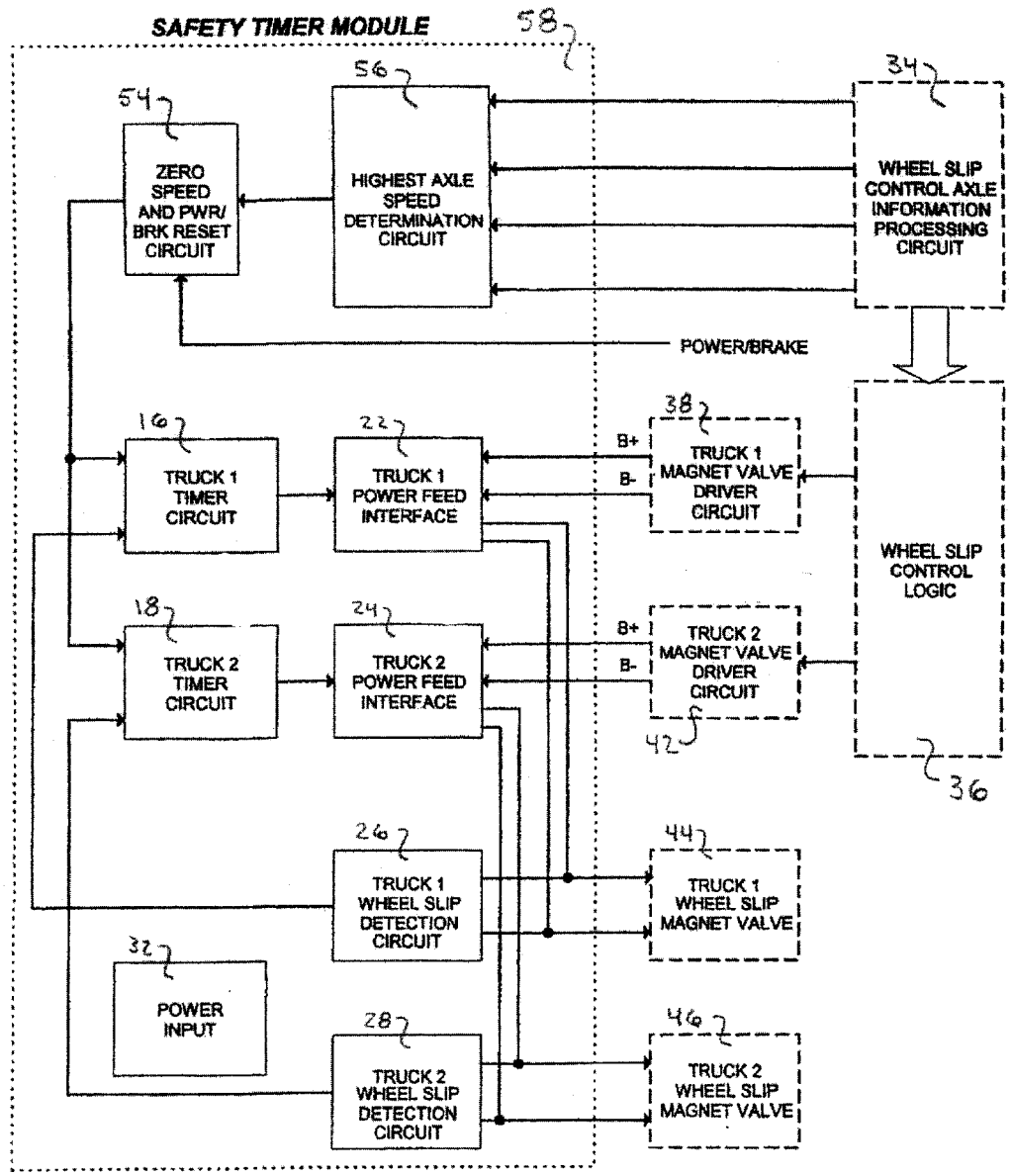
FIG. 1 is a block diagram of the most common form of the prior art safety timer circuit, which uses zero vehicle axle speed and a power/brake indication to reset the safety timer.

BRIEF DESCRIPTION OF THE PRESENTLY PREFERRED AND ALTERNATE EMBODIMENTS OF THE INVENTION

Prior to proceeding with the more detailed description of the present invention it should be noted that, for the sake of clarity, identical components, which have identical functions have been designated by identical reference numerals throughout the several views illustrated in the drawings.

By comparison the time reset safety timer circuit of the present invention eliminates approximately half of the external interfaces of the prior art safety timers. The prior art safety timers, as illustrated in FIGS. 1 and 2, depend on vehicle axle speeds, brake indications, and/or trainline signals to initiate a safety timer reset.

Figure 2:
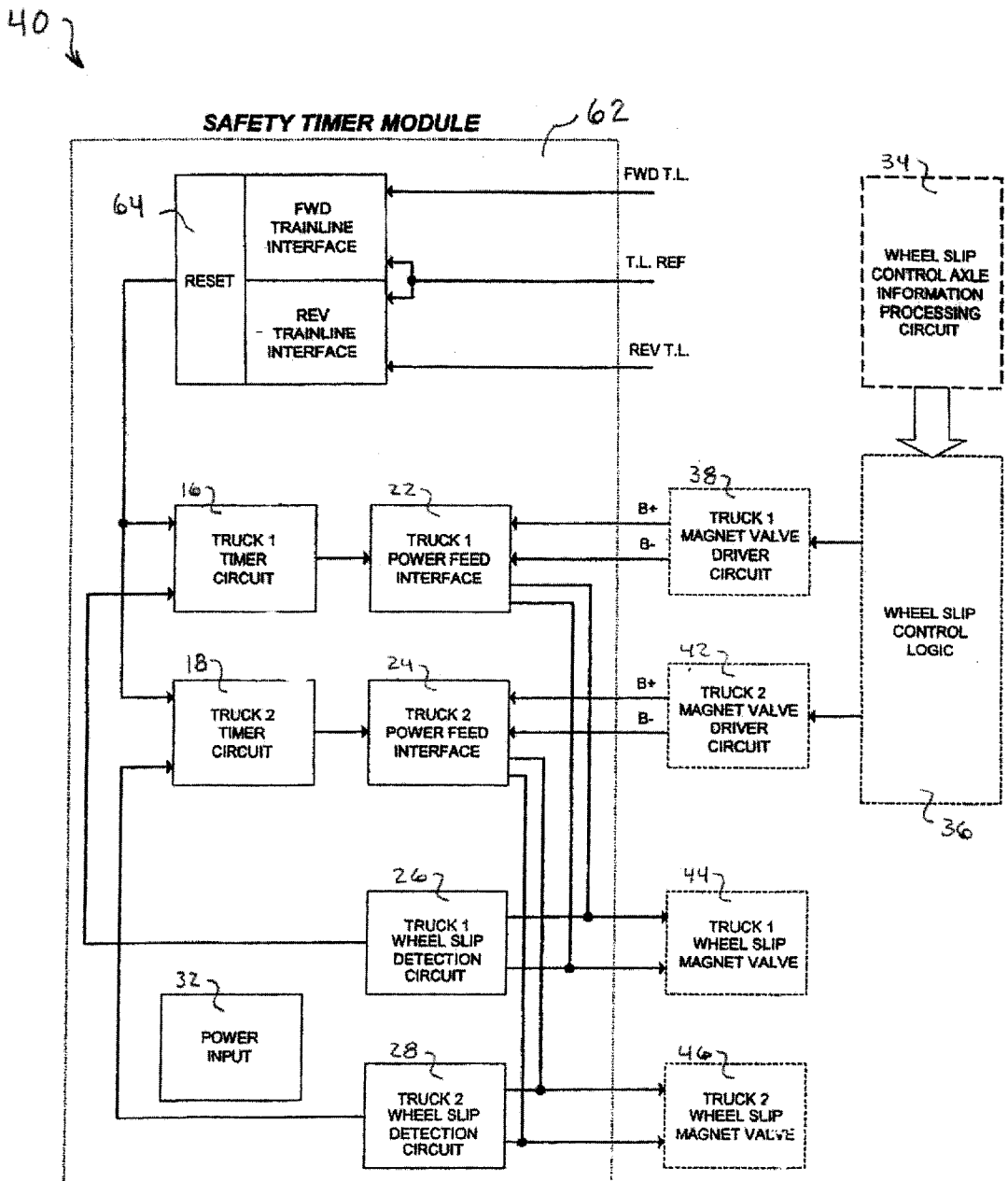
FIG. 2 is a block diagram of a prior art safety timer circuit, which uses transition of either the forward or reverse trainline to reset the safety timer.

FIGS. 1 and 2 showing prior art safety timer circuits are further discussed below after the following discussion with respect to FIGS. 3 and 4.

Figure 3:
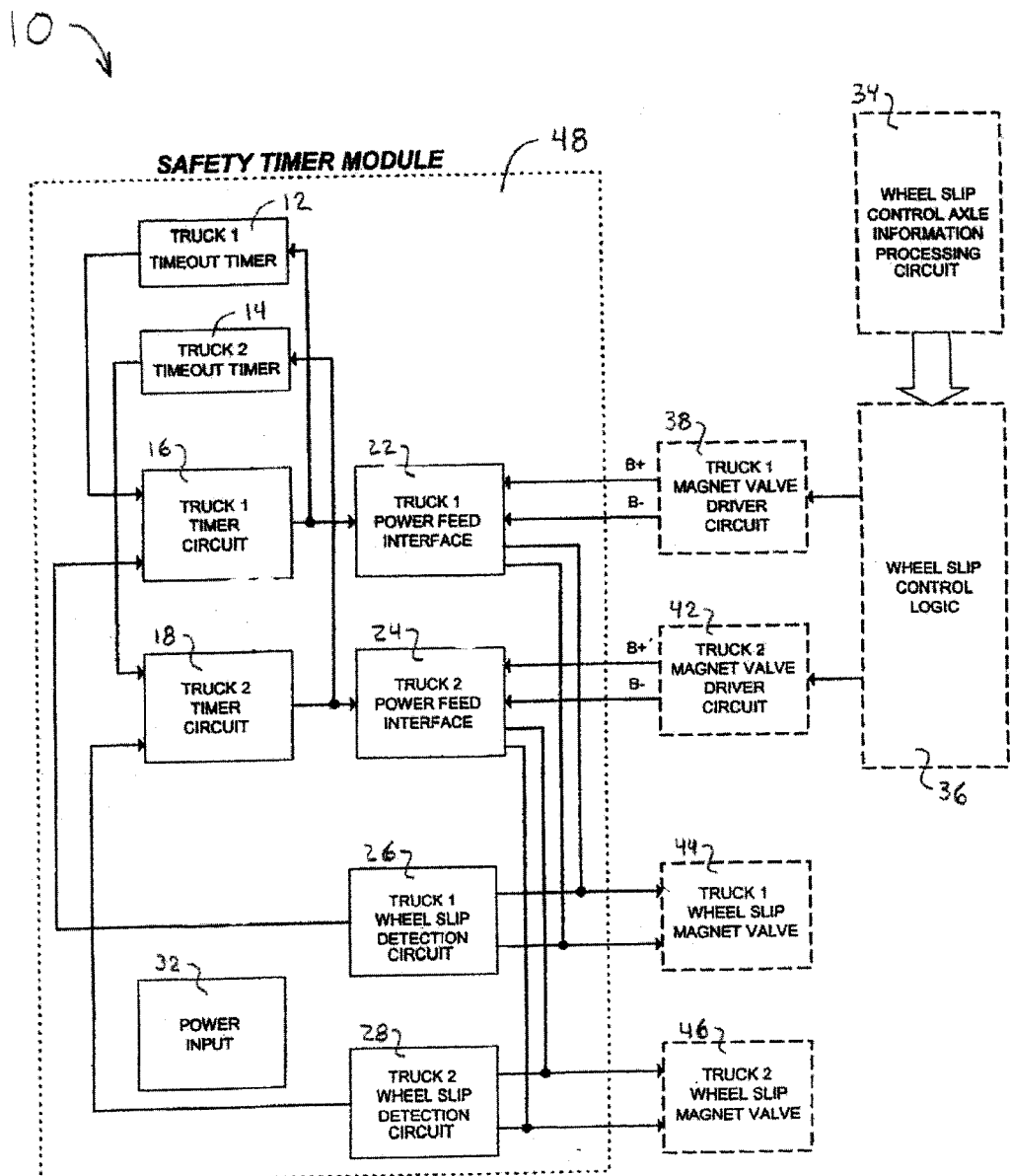
FIG. 3 is a block diagram of a standard implementation of the time reset safety timer circuit according to the present invention.

Referring now to FIG. 3, the time reset safety timer circuit generally designated as 10 uses only internal information to initiate a safety timer reset, which significantly improves reliability. This is accomplished through the use of a safety timer module 48. Circuitry in the time reset safety timer circuit 10 resets a safety timer circuit shown as Truck 1 Timer Circuit 16 in the drawing when an internal timer in a Truck 1 Timeout Timer 12 ends its count from about 104 sec to about 0 sec. The internal timer in the Truck 1 Timeout Timer 12 starts counting upon the loss of a wheel slip correction enable signal from the Truck 1 Timer Circuit 16. When the Truck 1 Timeout Timer 12 reaches 0 seconds it sends a reset pulse to the reset input of the Truck 1 Timer Circuit 16 and resets itself for the next time that the Truck 1 Timer Circuit 16 transitions to a timed out state. The Truck 1 Timer Circuit 16 is the truck 1 valve protection timer circuit.

When the Truck 1 Timer Circuit 16 is not timed out it provides the wheel slip correction enable signal to the Truck 1 Timeout Timer 12 and to a Truck 1 Power Feed Interface 22. When the Truck 1 Timer Circuit 16 receives a detection signal from a Truck 1 Wheel Slip Detection Circuit 26, it enters a timing state and its internal timer begins counting down from 3 seconds to 0 seconds. If this detection signal from the Truck 1 Wheel Slip Detection Circuit 26 goes away for at least 40 milliseconds (ms) while the Truck 1 Timer Circuit 16 is in a counting state, the Truck 1 Timer Circuit 16 will reset itself to 3 seconds and enter into a reset state. If this detection signal from the Truck 1 Wheel Slip Detection Circuit 26 remains constant for greater than or equal to 3 seconds, the Truck 1 Timer Circuit 16 changes to a timed out state and removes the wheel slip correction enable signal to the Truck 1 Power Feed Interface 22. The Truck 1 Timer Circuit 16 will remain in the timed out state until it receives the reset pulse at its reset input. The reset pulse comes from the output of the Truck 1 Timeout Timer 12. Upon receiving the reset pulse from the Truck 1 Timeout Timer 12, the Truck 1 Timer Circuit 16 will reset and hold the timeout to 3 seconds and reapply the wheel slip correction enable signal to the Truck 1 Power Feed Interface 22 until it detects a detection signal from the Wheel Slip Detection Circuit 26.

In the same manner when a,Truck 2 Timer Circuit 18 goes to a timed out state, a Truck 2 Timeout Timer 14 begins counting down from 104 seconds to 0 seconds. When it reaches 0 seconds it sends out a reset pulse to the Truck 2 Timer Circuit 18 and resets itself for the next time that the Truck 2 Timer Circuit 18 transitions to a timed out state.

When the Truck 2 Timer Circuit 18 is not timed out, it applies a truck 2 wheel slip correction enable signal to a Truck 2 Power Feed Interface 24. When the Truck 2 Timer Circuit 18 receives a truck 2 detection signal from a Truck 2 Wheel Slip Detection Circuit 28, it begins counting down from 3 seconds to 0 seconds. If this truck 2 detection signal from the Truck 2 Wheel Slip Detection Circuit 28 goes away for at least 40 ms before the Truck 2 Timer Circuit 18 counts down to 0 seconds, the Truck 2 Timer Circuit 18 will reset itself to 3 seconds. If this truck 2 detection signal from the Truck 2 Wheel Slip Detection Circuit 28 remains for greater than or equal to 3 seconds, the Truck 2 Timer Circuit 18 will enter a timed out state and remove the truck 2 wheel slip correction enable signal to the Truck 2 Power Feed Interface 24. The Truck 2 Timer Circuit 18 will remain in this timed out state until it receives a truck 2 reset pulse from the Truck 2 Timeout Timer 14. Upon receiving a truck 2 reset pulse from the Truck 2 Timeout Timer. 14, the Truck 2 Timer Circuit 18 will reset to 3 seconds and remain reset until it detects a truck 2 detection signal from the Truck 2 Wheel Slip Detection Circuit 28.

The Truck 1 Power Feed Interface 22 passes or interrupts the power feed from a Truck 1 Magnet Valve Driver Circuit 38 to a Truck 1 Wheel Slip Magnet Valve 44. When the Truck 1 Timer Circuit 16 sends the wheel slip corrections enable signal to the Truck 1 Power Feed Interface 22, the circuit between the Truck 1 Magnet Valve Driver Circuit 38 land the Truck 1 Wheel Slip Magnet Valve 44 is completed. When the Truck 1 Timer Circuit 16 removes the wheel slip correction enable signal to the Truck 1 Power Feed Interface 22, the circuit between Truck 1 Magnet Valve Driver Circuit 38 and Truck 1 Wheel Slip Magnet Valve 44 is interrupted.

The Truck 2 Power Feed Interface 24 passes or interrupts a power feed from a Truck 2 Magnet Valve Driver Circuit 42 and a Truck 2 Wheel Slip Magnet Valve 46. When the Truck 2 Timer Circuit 18 sends a truck 2 wheel slip correction enable signal to the Truck 2 Power Feed Interface. 24, the circuit between Truck 2 Magnet Valve Driver Circuit 42 and the Truck 2 Wheel Slip Magnet Valve 46 is completed. When the Truck 2 Timer Circuit 18 removes the truck 2 wheel slip correction enable signal from the Truck 2 Power Feed Interface 24, the circuit between the Truck 2 Magnet Valve Driver Circuit 42 and the Truck 2 Wheel Slip Magnet Valve 46 is interrupted.

The Truck 1 Wheel Slip Detection Circuit 26 monitors the state of the power feed to the Truck 1 Wheel Slip Magnet Valve 44. An output of the wheel slip detection circuit 26, indicative of the presence of the power feed to the Truck 1 Wheel Slip Magnet Valve 44, is sent to the trigger input of the Truck 1 Timer Circuit 16.

The Truck 2 Wheel Slip Detection Circuit 28 monitors the state of the power feed to Truck 2 Wheel Slip Magnet Valve 46. This detection of the presence of the power feed is continuously sent to the Truck 2 Timer Circuit 18.

A Power Input 32 represents an independent power source for the Safety Timer Module 48. Wheel Slip Control Axle Information Processing Circuit 34 represents the components used to process the vehicles axle speed (i.e. rotation speed), axle rate, and d/dt (axle rotation rate) signals. Wheel Slip Control Logic 36 represents the components used to perform the wheel slip control logic function. The Wheel Slip Control Logic 36 determines the nature of the command which is to be sent to the Wheel Slip Magnet Valves 44 and 46.

In operation, using the truck 1 circuitry as an example, the Wheel Slip Controller Logic 36 constantly monitors the axle information on a vehicle using data from the Wheel Slip Control Axle Information Processing Circuit 34. That is, Wheel Slip Control Axle Information Processing Circuit 34 sends the axle information to the Wheel Slip Control Logic 36. Irregularities in the information from the Wheel Slip Control Axle Information Processing Circuit 34, can occur such as the presence of an axle that has far less speed than the other axles on the vehicle. If this difference is great enough, the Wheel Slip Control Logic 36 will determine that the affected axle is slipping. The Wheel Slip Control Logic 36 will then command the Truck 1 Magnet Valve Driver 38 to send a power feed to the Truck 1 Wheel Slip Magnet valve 44 via the Truck 1 Power Feed Interface 22. If the Truck 1 Timer Circuit 16 is in the reset state, the Truck 1 Timer Circuit 16 enables the Truck 1 Power Feed Interface 22 to pass the power feed to the Truck 1 Wheel Slip Magnet Valve 44. When this occurs the Truck 1 Wheel Slip Detection Circuit 26 detects that the Truck 1 Wheel Slip Magnet Valve 44 has been energized and sends this information on to Truck 1 Timer Circuit 16. Truck 1 Timer Circuit 16 then enters the counting state and begins counting down from 3 seconds to 0 seconds.

Once the Wheel Slip Control Logic 36 determines that the slip has been corrected and directs the Truck 1 Magnet Valve Driver Circuit 38 to de-energize the power feed to the Truck 1 Wheel Slip Magnet Valve. 44 before the Truck 1 Timer Circuit 16 has reached 0 seconds, the Truck 1 Timer Circuit 16 will reset itself to 3 seconds and will not interrupt the wheel slip correction enable signal to the Truck 1 Power Feed Interface 22. When the Wheel Slip Control Logic 36 continues to detect a slip and continues to direct the Truck 1 Magnet Valve Driver Circuit 38 to energize the power feed to the Truck 1 Wheel Slip Magnet Valve 44 as the Truck 1 Timer Circuit 16 reaches 0 seconds, the Truck 1 Timer Circuit 16 will time out and interrupt the wheel slip correction enable signal to the Truck 1 Power Feed Interface 22. With the Truck 1 Power Feed Interface 22 in an interrupt state, the Truck 1 Magnet Valve Driver Circuit 38 can no longer energize the Truck 1 Wheel Slip Magnet Valve 44. At this point, the Truck 1 Timer Circuit 16 can only be reset by a reset pulse from the Truck 1 Timeout Timer 12 to the reset input of the Truck 1 Timer Circuit 16. The Truck 1 Timeout Timer 12 senses a timeout by the Truck 1 Timer Circuit 16 and begins counting down from 104 seconds to 0 seconds. Upon counting down to 0 seconds, the Truck 1 Timeout Timer 12 will reset itself and the Truck 1 Timer Circuit 16. When the Truck 1 Timer Circuit 16 is reset it will then apply the wheel slip correction enable signal to the Truck 1 Power Feed Interface 22 and allow the Truck 1 Magnet Valve Driver Circuit 38 to communicate with the Truck 1 Wheel Slip Magnet Valve 44. Circuitry applicable to truck 2 operates in an analogous manner.

Figure 4:
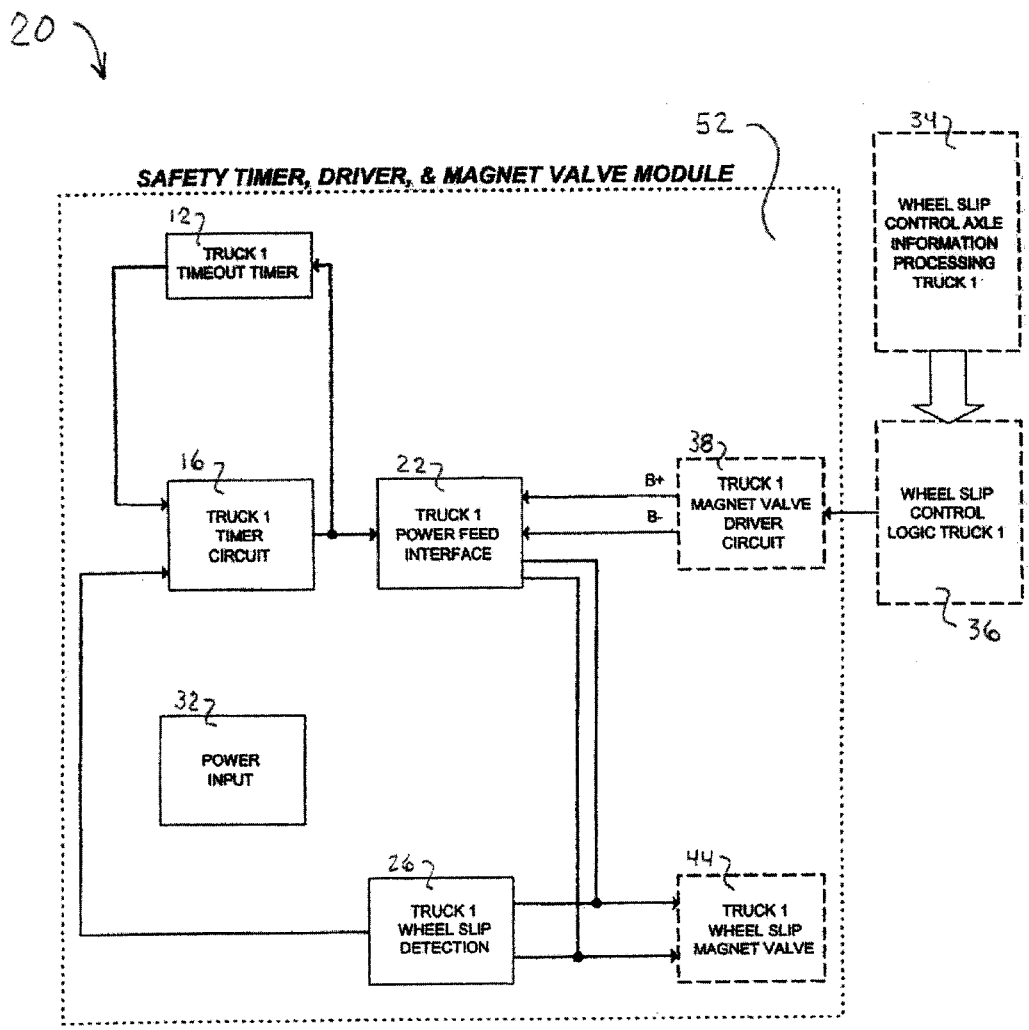
FIG. 4 is a block diagram of a distributed electronics system style implementation of the time reset safety timer circuit according to the present invention.

Referring now to FIG. 4, this figure illustrates a distributed electronics system generally designated as 20. FIG. 4 shows circuitry applicable to only truck 1, and it includes additional components to those shown in FIG. 3. This is realized through the use of the safety timer, driver, and magnet valve module 52 wherein the Wheel Slip Control Axle Information Processing Circuit 34 communicates with the magnet valve driver circuits 36 and the Truck 1 Magnet Valve Driver Circuit 38 over a network. If the safety timer, driver, and magnet valve module 52 needed external interfaces to perform a reset as in the prior art, this information would need to be communicated over the network, or else hardwired to the safety timer. Using a network and its inherent use of software for resetting a safety timer as in the prior art is problematic. By using the Truck 1 Timeout Timer Circuit 12 as shown FIG. 4, the Truck 1 Timer Circuit 16 is reset without depending on that same software to reset the Truck 1 Timer Circuit 16.

FIGS. 1 and 2 show prior art safety timers. In FIG. 1, the most common use of the prior art, the safety timer circuit uses zero vehicle axle speed detection and a power/brake indication to reset the safety timer. In FIG. 2 the safety timer circuit uses transition of either the forward or reverse trainline to reset the safety timer.

While both the presently preferred and a number of alternative embodiments of the present invention have been described in detail above it should be understood that various other adaptations and modifications of the present invention can be envisioned by those persons who are skilled in the relevant art of anti-lock brake systems without departing from either the spirit of the invention or the scope of the appended claims.

We claim:

1. A time reset safety timer circuit for use on a rail vehicle, said time reset safety timer circuit comprising:

a) at least one truck timeout timer means engageable with such rail vehicle and, in response to receiving at least one timed out signal, performing a first timing operation for a first predetermined duration using a first timing circuit in said at least one truck timeout timer means and at the end of said first timing operation resetting said first timing circuit and sending a safety timer reset signal;

b) at least one truck timer circuit means having a second timing circuit and being connected to said at least one truck timeout timer means for communicating said at least one timed out signal to said at least one truck timeout timer means after said second timing circuit performs a second timing operation for a second predetermined time upon receipt of a detection signal indicating a detection of the presence of a power feed, and after the completion of said second timing operation sending said at least one timed out signal to said at least one truck timeout timer means, said second timing circuit being reset by one of receipt of said safety timer reset signal and an interruption of said detection signal indicating the absence of said power feed when said second timer circuit has started said second timing operation and prior to the lapse of said second predetermined time;

c) at least one truck power feed interface means connected to said at least one truck timer circuit means for receiving a wheel slip correction enable signal from said at least one truck timer circuit means, said at least one truck power feed interface means connected to at least one magnet valve driver circuit and at least one wheel slip magnet valve, said at least one truck power feed interface means also for one of passing and interrupting said power feed between said at least one magnet valve driver circuit and said at least one wheel slip magnet valve; and d) at least one truck wheel slip detection circuit connected to at least one input of said at least one wheel slip magnet valve for detecting the presence of said power feed, and also communicating said presence of said power feed to said at least one truck timer circuit means, said at least one truck timer circuit means used for one of applying and disabling said wheel slip correction enable signal to said at least one truck power feed interface means after receiving said detection signal from said at least one truck wheel slip detection circuit.

2. A time reset safety timer circuit, according to claim 1, wherein said wheel slip correction enable signal is disabled when said second timer has completed said second timing operation without being subsequently reset.

3. A time reset safety timer circuit, according to claim 1, wherein said communication of said wheel slip correction enable signal is for passing a power feed from said at least one truck magnet valve driver circuit means and said at least one truck wheel slip magnet valve and otherwise interrupting said power feed.

4. A time reset safety timer circuit, according to claim 1, wherein said first predetermined duration is about 104 seconds.

5. A time reset safety timer circuit, according to claim 1, wherein said second predetermined duration is at least about 3 seconds.

6. A time reset safety tinier circuit, according to claim 1, wherein said time reset safety timer circuit enables and interrupts a wheel slip correction operation to a plurality of trucks.

7. A time reset safety timer circuit, according to claim 1, wherein the duration of said interruption of said detection signal must be longer than a third predetermined duration to reset said at least one truck timer circuit means.

8. A time reset safety timer circuit, according to claim 7, wherein said third predetermined duration is 40 ms.

9. A time reset safety timer circuit comprising:

a) a safety timer circuit having a trigger input, a reset input and an output, said safety timer circuit also having a first internal timer of a first time duration, said safety timer circuit operating in one of a reset state, a counting state, and a timed out state;

b) a timeout timer circuit having an input and an output, said timeout timer circuit having a second internal timer of a second time duration;

c) a magnet valve driver circuit providing a power feed coupled through a power feed interface to a wheel slip magnet valve;

d) a wheel slip detection circuit which receives said power feed at an output of said power feed interface and outputs a detection signal to said trigger input of said safety timer circuit when said power feed is received by said wheel slip detection circuit;

e) said output of said safety timer circuit coupled to said input of said timeout timer circuit and to an input of said power feed interface/and when said safety timer circuit is in one of said reset state and said timed-out state, said output of said safety timer circuit provides a wheel slip correction enable signal, and does not provide said wheel slip correction enable signal when said safety timer circuit is in said timed out state;

f) said safety timer circuit entering said reset state upon reception of one of cessation of said detection signal at said trigger input when said safety timer circuit is in said timed-out state, and a pulse reset signal from said timeout timer circuit at said reset input, said safety timer circuit entering said timed-out state upon the detection by said safety timer circuit of said detection signal, and entering said timed out state after completion of said first time duration when said safety timer circuit is in said timed-out state; and g) said timeout timer circuit enabling said second internal timer upon receipt of cessation of said wheel slip correction enable signal at said input, and at the completion of said second predetermined duration sending a reset signal from said output of said timeout timer circuit to said reset input of said safety timer circuit, and also resetting said second internal timer.

10. A time reset safety timer circuit comprising:

a) a safety timer which interrupts a wheel slip control operation after a first predetermined time after said wheel slip control operation begins; and b) a timeout timer which resets said safety time circuit after a second predetermined time after said safety timer interrupts said wheel slip control operation to thereby stop said interrupt.

11. A time reset safety timer circuit, according to claim 10, wherein said safety timer, upon being reset, stops interrupting said wheel slip control operation for said first predetermined time if said wheel slip control operation is running, and remains reset if said wheel slip control operation is not running.

12. A time reset safety timer circuit, according to claim 10, wherein said wheel slip control operation is initiated by circuitry which monitors a rotation rate of a plurality of axles of a rail vehicle.

13. A method for interrupting and stop interrupting a wheel slip control operation comprising the steps of:

a) waiting a first predetermined time period after an onset of said wheel slip operation;

b) interrupting said wheel slip control operation after said first predetermined time period if said wheel slip control operation is continuous during said first predetermined time period;

c) waiting for a second predetermined time period after said wheel slip control operation has been interrupted; and d) removing said interruption of step b), and, if said wheel slip control operation is running, waiting said first predetermined time period and repeating steps b) through d).

14. A method for interrupting and stop interrupting a wheel slip control operation, according to claim 13 including the additional step of stop interrupting said wheel slip control operation and repeating step a) if said wheel slip control operation is not continuous during said first predetermined time period.

15. A safety timer, magnet valve driver circuit, and wheel slip magnet valve module circuit for use on a rail vehicle, said safety timer, magnet valve driver circuit, and wheel slip magnet valve module circuit comprising:

a) at least one truck timeout timer means engageable with such rail vehicle and, in response to receiving at least one timed out signal, performing a first timing operation for a first predetermined duration using a first timing circuit in said at least one truck timeout timer means and at the end of said first timing operation resetting said first timing circuit and sending a safety timer reset signal;

b) at least one truck timer circuit means having a second timing circuit and being connected to said at least one truck timeout timer means for communicating said at least one timed out signal to said at least one truck timeout timer means after said second timing circuit performs a second timing operation for a second predetermined time upon receipt of a detection signal indicating a detection of the presence of a power feed, and after the completion of said second timing operation spending said at least one timed out signal to said at least one truck timeout timer means, said second timing circuit being reset by one of receipt of said safety timer reset signal and an interruption of said detection signal indicating the absence of said power feed when said second timing circuit has started said second timing operation and prior to the lapse of said second predetermined time;

c) at least one truck power feed interface means connected to said at least one truck timer circuit means for receiving a wheel slip correction enable signal from said at least one truck timer circuit means, said at least one truck power feed interface means connected to at least one magnet valve driver circuit and at least one wheel slip magnet valve, said at least one truck power feed interface means also for one of passing and interrupting said power feed between said at least one magnet valve driver circuit and said at least one wheel slip magnet valve; and d) said magnet valve driver circuit means connected said truck power feed interface means for receiving said power feed and connectable to a wheel slip control logic for sending an electrical current for switching said truck wheel slip magnet valve between states of applied and not applied.

* * * * *